April 11, 1961   J. T. SMITH ET AL   2,979,233
PAINT COLOR DISPENSING MACHINE
Filed Feb. 27, 1959

INVENTORS
James T. Smith
John Denza
BY Joseph A. Genovese
ATTORNEY

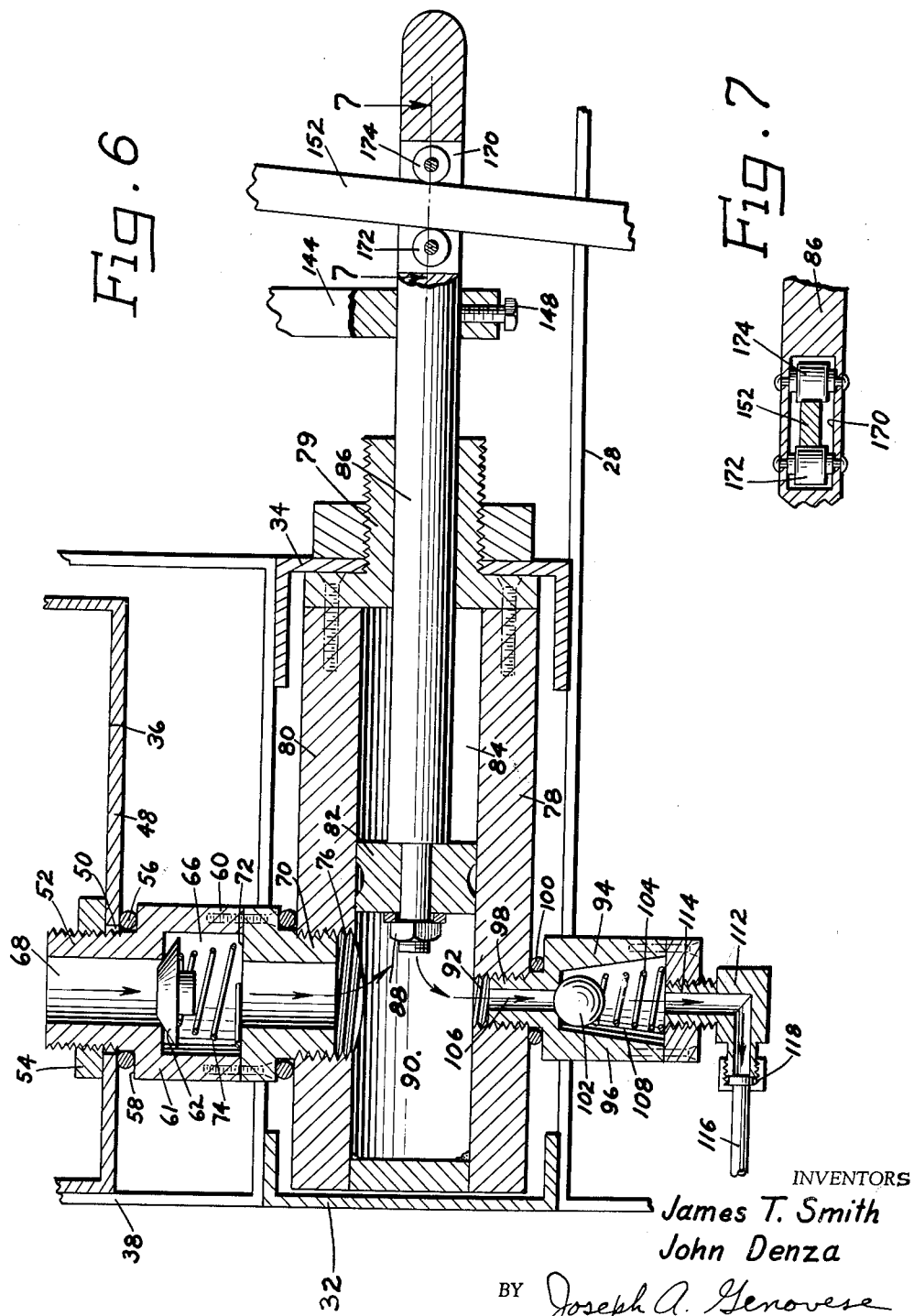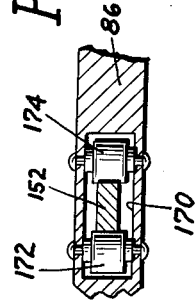

United States Patent Office 2,979,233
Patented Apr. 11, 1961

2,979,233

PAINT COLOR DISPENSING MACHINE

James T. Smith, 163 S. Long Beach Ave., and John Denza, 100 Lexington Ave., both of Freeport, N.Y.

Filed Feb. 27, 1959, Ser. No. 796,005

9 Claims. (Cl. 222—135)

This invention relates to dispensing equipment, and more particularly to a dispensing machine ideally suited for dispensing paint colors.

In the past, the art of dispensing colors has been applied to machines, but it is our observation that the apparatus used for dispensing paint colors has always been complicated and expensive. Most machines are expensive, require a source of available electrical current for operation, and are subject to considerable maintenance. Our dispensing machine is comparatively simple in its construction and serves the intended purpose very well. There are no electrical components in the machine, and the mechanical organization is very simple and dependable.

An object of the invention is to provide a mechanically simple, easily operated machine for dispensing colors, particularly at the retail level in commerce, there being available to the operator an easily operated metering system enabling the operator to select the precise quantity of a given color substance for discharge into a container.

Any number of colors may be made available by simply enlarging or reducing the capacity of the machine. Each available color substance may be dispensed in a selected given amount, for instance, an eighth of an ounce, a quarter of an ounce, or any other given quantity, depending on the desires of the user of the machine. When the desired quantity of color substance is selected by manually setting a metering rod, manual operation of a pump actuating handle automatically discharges the selected quantity of the coloring substance. Upon return of the pump to its rest position, the pump chamber is automatically replenished with color substance in the amount that was discharged during the pump stroke.

Accordingly, a further object of the invention is to provide a unique metering assembly which is integrated with a pump so that only a selected quantity of a given color substance is discharged upon actuation of the pump during the pumping stroke thereof, and upon the return stroke of the pump, the pump chamber is automatically supplied with enough of the color substance to fill the pump chamber. This prepares the pump chamber for its next operational cycle.

Another object of the invention is to provide a pump metering system which is especially useful for paint dispensing but which may be used for dispensing other substances or mixing other liquid substances, the pump and metering assembly after being set, relying on a single manual operation for discharging the precise quantity of color substance and for replenishing the pump chamber so that it is maintained in its charged condition during all non-use periods.

A further object of our invention is to provide a dispensing machine which is fully mechanical in its operation; which is easy to operate; and which may be operated very rapidly by an unskilled person capable of following instructions as to only two simple mechanical operations of setting the metering rod of a given color chamber and operating the pump rod for that chamber.

Other objects and features of importance will become evident to those skilled in this art in following the description of the illustrated form of the invention. The illustrated dispensing machine merely exemplifies the principles of the invention, it being understood that a number of changes and alterations and modifications of other types may be made herein.

Figure 6 is an enlarged sectional view taken on the line 6—6 of Figure 5 showing the pump assembly for a single color substance in the machine.

Figure 7 is a sectional view showing a detail of construction and taken on the line 7—7 of Figure 6.

Figure 1:
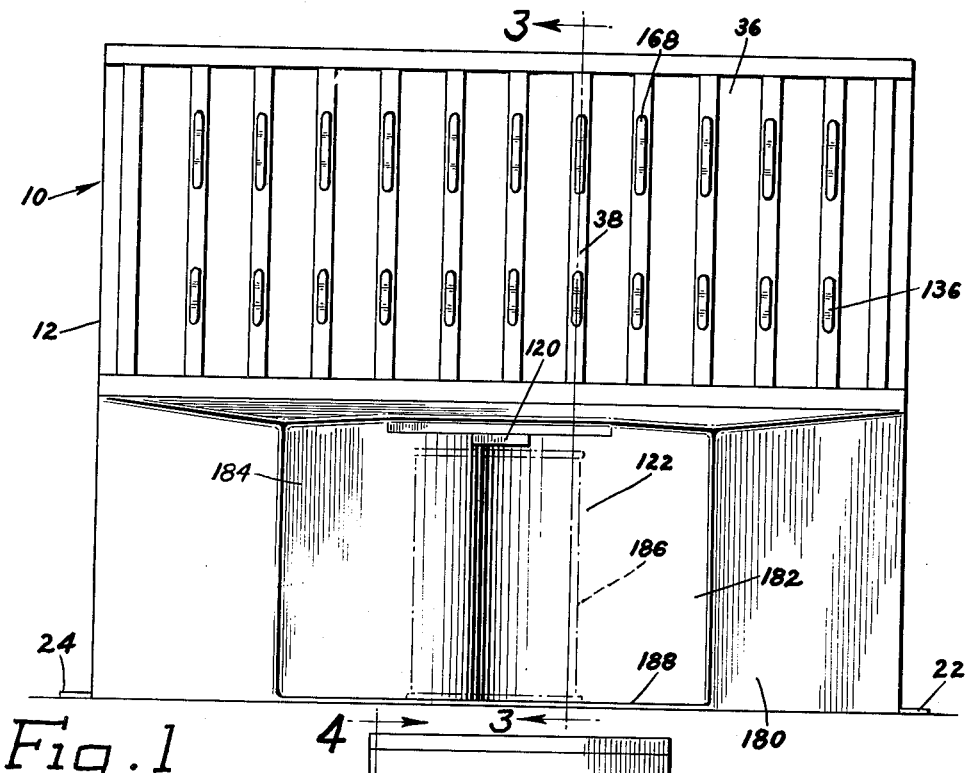
Figure 1 is a front elevational view of the dispensing machine.
Figure 2:
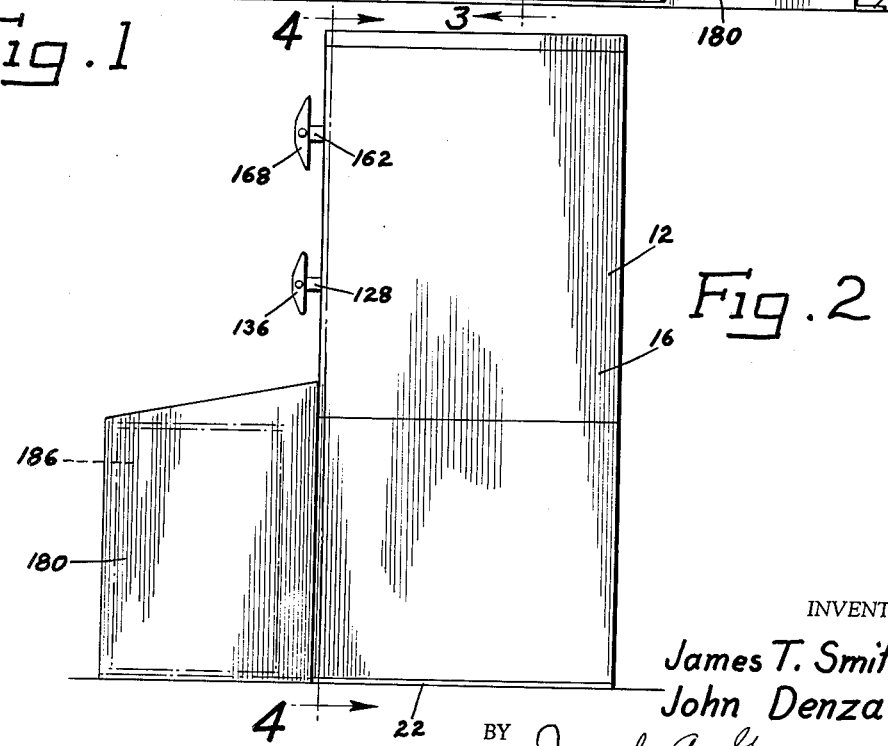
Figure 2 is a side view of the machine in Figure 1.

In the accompanying drawings, there is a paint dispensing machine 10 which is a typical blending machine constructed in accordance with the invention. Machine 10 has a main frame 12 which functions as a structural support for the various parts of the machine. Frame 12 has sides 14 and 16, a top wall 18, and a bottom 20 attached to sides 14 and 16 slightly above flanged feet 22 and 24. The back of the machine may be left open and the same holds true for the bottom, these being minor structural details. Sides 14 and 16 support housing 26 on a pair of inwardly extending flanges 28 and 30. Sides 14 and 16 together with the top wall 18 constitute a case for the machine, while housing 26 having a front wall 32, a rear wall 34 and ends functions to support a number of pumps and other structure. It is preferred that the top portion of the machine case be separable from the lower portion and therefore, sides 14 and 16 may be divided at flanges 28 and 30 (Figure 4) so that the top portion of the machine case may be lifted from the bottom portion to expose a plurality of reservoirs 36 within which color substances are contained.

Figure 3:
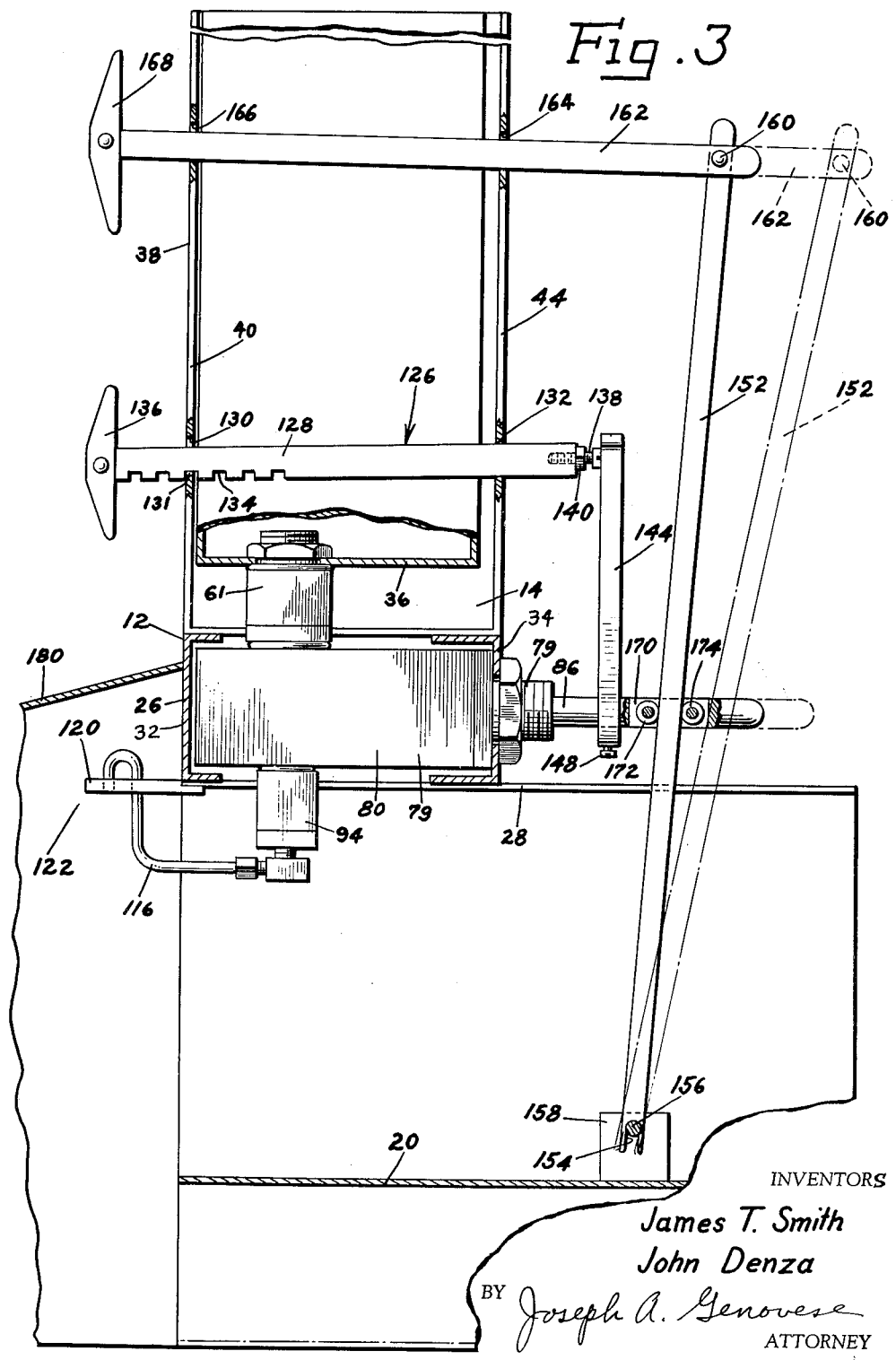
Figure 3 is a sectional view taken on the line 3—3 of Figure 1.

A plurality of parallel, horizontally spaced subframes 38 are secured to the top of housing 26, and each subframe is rectangular with a front strip 40, a bottom strip 42, a rear strip 44 and a top strip joined to the front and rear strips 40 and 44. Reservoirs, preferably made of rectangular containers, are disposed between subframes 38 under the protective covering of the upper section of the case of the machine. Each reservoir contains a different color or shade of coloring substance, and all reservoirs are identical in construction. The same holds true for the metering and pump mechanisms (Figures 3 and 6) associated with each reservoir. Therefore, only one reservoir, metering mechanism and pump mechanism is shown in detail in the last-mentioned figures. Typical reservoir 36 has a bottom wall 48 in which there is an aperture 50 to receive nipple 52. The nipple is externally threaded so that nut 54 may be threaded on it and engage the inside surface of bottom 48. Seal 56, such as an O-ring, is in engagement with the bottom surface of the reservoir around aperture 50 and bears against shoulder 58 of valve body 60. The valve body contains valve element 62 that is held in the normally closed position by spring 74. Valve chamber 66 enclosed by valve body 60 contains spring 74 and valve element 62, the valve element oriented to control the inflow of liquid substance from reservoir 36. The valve being described is a flutter valve which controls passage 68 extending through valve body 60 and including valve chamber 66, nipple 52 and lower nipple 70, The lower nipple is connected to the valve body and furnishes shoulder 72 on which spring 74 is seated. The spring also bears against valve element 62, which is preferably in the form of a truncated cone.

Nipple 70 is threaded into bore 76 of pump body 78. Pump 80 has a plunger 82 which is reciprocable in the bore 84 of the pump body, and there is a pump actuating rod 86 attached to plunger 82 by a conventional fastening device, for example, nut 88 backed by a washer. Pump chamber 90 in the body 78 of the pump is in continual registry with passage 68, this passage constituting an inlet for the pump 80. The outlet 92 of the pump is diametrically opposed from the pump inlet and has a flutter valve 94 associated with it. Valve 94 has a valve body 96 provided with a nipple 98 threaded into the pump outlet port, and there is a seal 100 between valve body 96 and pump body 78. Valve element 102 is preferably a ball pressed by spring 104 to a position closing passage 106 through nipple 98 and which communicates pump chamber 90 with the valve chamber 108. Accordingly, valve 94 is a normally closed valve. The difference between the two described valves is that valve 94 is suction closed, whereas valve 61 is opened under the influence of suction in pump chamber 90. Conversely, valve 94 is pressure opened, while valve 61 is pressure closed.

Figure 4:
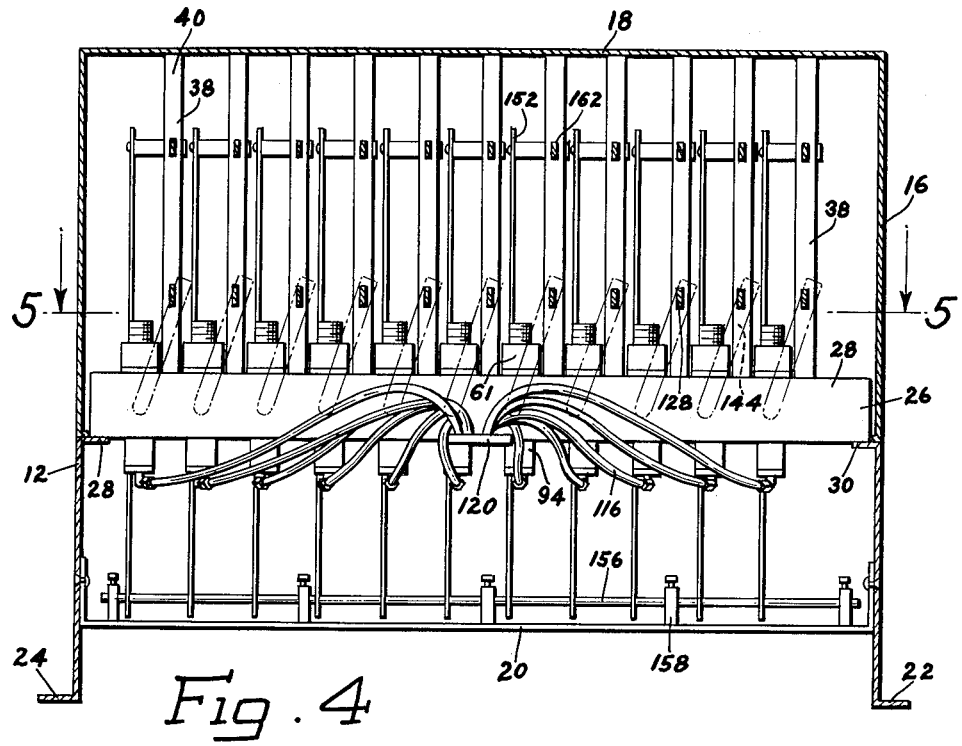
Figure 4 is a sectional view taken approximately on the line 4—4 of Figure 2.
Figure 5:
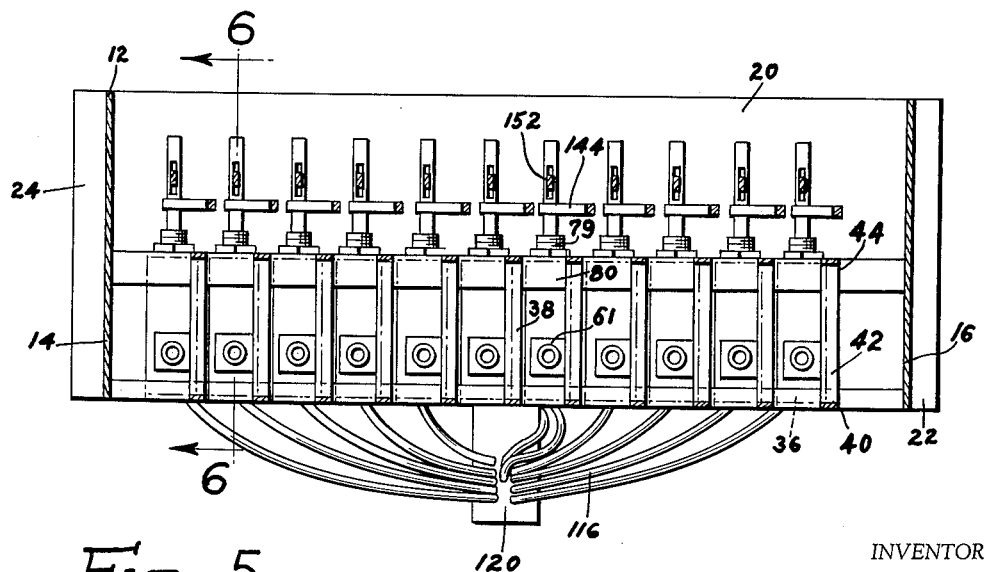
Figure 5 is a transverse sectional view taken on the line 5—5 of Figure 4, the front paint container support being omitted from this view for clarity.

Valve body 96 has an elbow 112 connected with the discharge port 114 thereof, and the elbow constitutes a portion of a conductor for liquid substance which is expressed from pump chamber 90. Tubing 116 which may be rigid or flexible, is connected by coupling 118 to elbow 112 and extends to orifice block 120 which is attached to the front center of housing 26. As seen in Figure 4, there is a single conductor identical to conductor 116 for each reservoir-pump-metering assembly, and all of the conductors extend to a common discharge orifice block 120 which simply holds the ends of the conductors assembled at a discharge station 122.

Metering assembly 126 for the color substance in reservoir 36 (Figure 3) includes metering rod 128 which extends through a pair of aligned slots 130 and 132 in the front and rear strips 40 and 44, respectively, of one of the subframes 38. A row of notches 134 is in the lower edge of rod 128, and there is a knob, handle 136, or the like attached to the outer end of metering rod 128. The inner end of the metering rod has an adjustment screw 138 threaded therein and locked in adjusted position by lock nut 140 on screw 138. By lifting handle 136, one of the notches 134 is disengaged from the lower edge 131 of slot 130 so that the metering rod may be slid forward or backward with reference to the subframe 38 and locked in place by dropping the metering rod into another position with a different notch 134 engaged with the lower edge of slot 130. This longitudinal positioning of metering rod 128 is directly responsible for the quantity of color substance which is discharged from pump chamber 90.

Arm 144 is secured to rod 86 by having an opening in it through which the rod extends. Setscrew 148 is attached to arm 144 and engages the surface of rod 86 to hold arm 144 fastened in a selected position on rod 86. A face of arm 144 is contacted by the head of screw 138 as the pump is actuated, thereby limiting the extent of movement of the pump plunger in bore 84. It is now evident that the metering assembly 126 establishes a selected length of stroke of pump 80 in accordance with the longitudinally adjusted position of metering rod 128.

The means for actuating pump 80 are of an entirely mechanical nature. They consist of a lever 152 having a fork 154 at its lower end which constitutes a saddle fitting over fixed spindle 156. The fixed spindle is attached to upstanding brackets 158 on the bottom 20 of the machine frame. Spindle 156 extends the full width of the machine or essentially so in order to accommodate the pump actuating lever 152 for each pump. The illustration has eleven pumps, eleven reservoirs and eleven additional groups of structures associated with each. It is clearly evident that this number may be enlarged or decreased depending on the capacity of the machine which is considered desirable for a specific need or group of needs.

The upper end of lever 152 has a pivot pin 160 assembly by which push rod 162 is pivotally connected to lever 152. The push rod is extended through a pair of slots 164 and 166 in strips 40 and 44 of subframe 38. It has a knob, handle 168, or the like at its outer extremity which is adapted to be used when operating the push rod 162. Lever 152 is rocked back and forth in response to a single reciprocation of push rod 162. Mechanical connection between the pump plunger rod 86 and lever 152 is made by having the lever 152 passed through a slot 170 in rod 86. A pair of rollers 172 and 174 are mounted for rotation on spindles which span slot 170 and which are spaced a sufficient distance to enable the lever 152 to work freely therebetween. Hence, rocking movement of lever 152 is converted to reciprocatory movement of the pump plunger which, in turn, enlarges and reduces the volume of pump chamber 90.

The front of the machine case has a forwardly projecting bonnet 180 provided with a pair of panels 182 and 184 arranged in a V-shaped formation to form a pocket within which to accommodate a receptacle 186. Floor 188 for the receptacle 186 is attached to panels 182 and 184 below station 122. The user of the machine is required to place a typical receptacle 186 on floor 188 and slide it rearwardly into the V-shaped pocket formed by panels 182 and 184, thereby automatically positioning the open top of receptacle 186 beneath the orifice block 120, thereby assuring that the color substance discharged from one of the conductors in station 122 will flow thereinto.

In operation, it is assumed that the reservoirs each contain the necessary coloring liquid substance, and that the operator has placed a receptacle 186 properly on floor 188 beneath orifice block 120. For paint blending, receptacle 186 would ordinarily be filled or at least contain some paint or other liquid substance such as paint ingredients. The operator then decides how much coloring substance is to be expressed from one of the color substance stations and into receptacle 186. After the decision is made, metering assembly 126 is adjusted by positioning rod 128 in the correct place throughout the range provided by the number of notches 134 in the lower edge of rod 128. A practical notch arrangement would be to have the notches spaced distances which will cause the pump to discharge quantities of coloring substance deviating in increments of one-eighth ounce, although, here again, for applications other than paint or for other reasons, the notch spacing may be altered in accordance with the desires of the manufacturer. When set, rod 128 acts as a stop for the pump plunger, that is, the stroke of the pump is altered in accordance with the position of rod 128.

The next step in the operation is to pull handle 168, thereby actuating the linkage which includes push rod 162 and lever 152. This will cause rod 86 to be moved inwardly of the pump housing 78 thereby pressurizing pump chamber 90. As pump chamber 90 is completely filled with substance from reservoir 36, valves 61 and 94 will be simultaneously actuated. Valve 61 closes under the influence of pressure in chamber 90, and valve 94 opens simultaneously therewith or essentially simultaneously therewith. During the time that chamber 90 is under pressure, substance in an amount proportional to the stroke of the plunger 82 will be discharged through port 92, valve 94 and the conductor 116 connected with the valve 94. This substance passes through the conductor 116 and is discharged at station 122 into receptacle 186.

The operator then should return handle 168 to the rest position. This is done by pushing handle 168 and returning the linkage to the rest position. Since lever 152 of this linkage is mechanically, drivingly connected with rod 86, the rod is returned to the rest position toward coupling 79 which mechanically secures the pump body 78 to the back wall 30 of housing 26. As a result of the return stroke of plunger 82, a suction is drawn in chamber 90, thereby causing valve 94 to close and valve 61 to open. Since valve 61 controls the admission of additional coloring substance from reservoir 36, additional coloring substance sufficient to completely fill chamber 90 is drawn from reservoir 36 and into chamber 90, thereby automatically preparing the machine for further operation.

It is understood that various changes may be made herein without depatring from the protection afforded by the following claims. For instance, a conventional electric heater may be disposed under the reservoirs to control the temperature of the contents thereof. This is particularly helpful in colder places. A paddle system which has a stirring paddle in each reservoir may be easily installed. A typical stirring system would be powered by a small geared electric motor, and with a paddle in each reservoir, the inerts of the substance in each reservoir will be prevented from separating. Finally, the metering device 126 can obviously be made to dispense charges of material which are exceedingly small.

We claim:

1. A dispensing machine comprising a frame, a plurality of reservoirs carried by said frame, each reservoir adapted to contain a liquid, means carried by said frame and operatively associated with each reservoir for discharging a predetermined quantity of liquid therefrom, each reservoir having similar means connected therewith for individual selection of a liquid from individual reservoirs, said means including a normally closed flutter valve connected with the reservoir, a pump having a pump chamber in communication with said normally closed valve, a second normally closed outflow valve also connected with said pump chamber, one of said valves being opened in response to pressure in said chamber, and the other of said valves being closed in response to the same pressure in said chamber so that a quantity of liquid from said pump chamber is expressed through said outflow valve in response to operation of said pump during the compression stroke thereof, an outflow tube connected with said chamber and controlled by said outflow valve, each pump chamber having a similar outflow tube, an orifice block with which the discharge ends of said outflow tubes are connected, and means connected with said outflow valve for conducting the expressed liquid therefrom.

2. A dispensing machine comprising a frame, a plurality of reservoirs carried by said frame, each reservoir adapted to contain a liquid, means carried by said frame and operatively associated with each reservoir for discharging a predetermined quantity of liquid therefrom, each reservoir having similar means connected therewith for individual selection of a liquid from individual reservoirs, said means including a normally closed flutter valve connected with the reservoir, a pump having a pump chamber in communication with said normally closed valve, a second normally closed outflow valve also connected with said pump chamber, one of said valves being opened in response to pressure in said chamber, and the other of said valves being closed in response to the same pressure in said chamber so that a quantity of liquid from said pump chamber is expressed through said outflow valve in response to operation of said pump during the compression stroke thereof, an outflow tube connected with said chamber and controlled by said outflow valve, each pump chamber having a similar outflow tube, an orifice block with which the discharge ends of said outflow tubes are connected, means connected with said pump for regulating the quantity of liquid expressed through said outflow valve by governing the stroke of the pump, said regulating means including a manually operated metering rod, a latch for holding said metering rod in selected adjusted positions, and means adjustably connected to said pump forming an adjustable abutment to engage said metering rod and thereby limiting the stroke of the pump.

3. A dispensing machine comprising a frame, a plurality of reservoirs carried by said frame, each reservoir adapted to contain a liquid, means carried by said frame and operatively associated with each reservoir for discharging a predetermined quantity of liquid therefrom, each reservoir having similar means connected therewith for individual selection of a liquid from individual reservoirs, said means including a normally closed flutter valve connected with the reservoir, a pump having a pump chamber in communication with said normally closed valve, a second normally closed outflow valve also connected with said pump chamber, one of said valves being opened in response to pressure in said chamber, and the other of said valves being closed in response to the same pressure in said chamber so that a quantity of liquid from said pump chamber is expressed through said outflow valve in response to operation of said pump during the compression stroke thereof, an outflow tube connected with said chamber and controlled by said outflow valve, each pump chamber having a similar outflow tube, an orifice block with which the discharge ends of said outflow tubes are connected, means connected with said pump for regulating the quantity of liquid expressed through said outflow valve by governing the stroke of the pump, said regulating means including a manually operated metering rod, a latch for holding said metering rod in selected adjusted positions, and means connected to said pump forming an abutment to engage said metering rod and thereby limiting the stroke of the pump, said abutment forming means including an arm attached to said pump, said metering rod having an adjustable means at one end thereof against which said arm abuts in the actuation of said pump.

4. A wholly mechanical dispensing machine for paint coloring substances, said dispensing machine comprising a frame, a plurality of individual pumps, each pump having a pump body enclosing a pump chamber together with a pump plunger having a rod, a plurality of reservoirs, one reservoir operatively connected with each pump so that one pump controls discharge from a single reservoir, inflow valves connected with said pumps, outflow valves connected with said pumps, said valves registering with said pump chamber and each valve consisting of a normally closed flutter valve structure, one of said valves being openable in response to pressure in said pump chamber and the other of said valves being closed in response to pressure in said pump chamber, the pressure closed valve intercommunicating a reservoir with one of said pumps, means connected with said rod for actuating said plunger and thereby increasing the compression in said pump chamber and closing said inflow valve while simultaneously opening said outflow valve thereby discharging a quantity of substance from said pump chamber through said outflow valve and in an amount proportional to the stroke of the plunger, adjustable mechanical means associated with said frame and operatively associated with said plunger rod to limit the extent of movement of said plunger rod and thereby establish a selected stop position for said plunger to meter the quantity of substance expressed from said pump chamber through said outflow valve, said means for actuating said pump rod including for each pump a linkage having a manually operated push rod constrained in its motion by said frame, and a lever pivotally connected to said frame at one end and mechanically connected to said plunger rod intermediate its ends so that upon manipulation of said push rod said lever actuates said plunger.

5. The combination of claim 4 wherein said plunger rod has an aperture through which said lever extends, and friction reducing means connected between said lever and opposing walls of the aperture in said plunger rod.

6. The combination of claim 4 wherein each of said outflow valves has a liquid conductor connected therewith, and an orifice block holding the ends of said conductors in assembly at a substance discharge station beneath which a receptacle is adapted to be supported.

7. A wholly mechanical dispensing machine for paint coloring substances, said dispensing machine comprising a frame, a plurality of individual pumps, each pump having a pump body enclosing a pump chamber together with a pump plunger having a rod, a plurality of reservoirs, one reservoir operatively connected with each pump so that one pump controls discharge from a single reservoir, inflow valves connected with said pumps, outflow valves connected with said pumps, said valves registering with said pump chamber and each valve consisting of a normally closed flutter valve structure, one of said valves being openable in response to pressure in said pump chamber and the other of said valves being closed in response to pressure in said pump chamber, the pressure closed valve intercommunicating a reservoir with one of said pumps, means connected with said rod for actuating said plunger and thereby increasing the compression in said pump chamber and closing said inflow valve while simultaneously opening said outflow valve thereby discharging a quantity of substance from said pump chamber through said outflow valve and in an amount proportional to the stroke of the plunger, adjustable mechanical means associated with said frame and operatively associated with said plunger rod to limit the extent of movement of said plunger rod and thereby establish a selected stop position for said plunger to meter the quantity of substance expressed from said pump chamber through said outflow valve, said means for actuating said pump rod including for each pump a linkage having a manually operated push rod constrained in its motion by said frame, a lever pivotally connected to said frame at one end and mechanically connected to said plunger rod intermediate its ends so that upon manipulation of said push rod said lever actuates said plunger, said inflow valve being opened in response to the creation of a suction in said chamber of said pump thereby establishing communication between said reservoir and said pump chamber, said outflow valve being closed thereby preventing further substance from being discharged from said pump chamber and enabling said chamber to have its supply of substance automatically replenished in response to the return of the pump plunger to the rest position.

8. In a machine for dispensing paints, the combination comprising a frame, a plurality of reservoirs carried by said frame, subframes connected with said frame, a plurality of pumps carried by said frame, each pump having a pump body provided with a pump chamber and a plunger therein with a plunger rod extending from said pump body, a mechanical linkage carried by each subframe and including a push rod and a lever pivotally connected with the push rod, mechanical means connecting said lever with said plunger rod to reciprocate said plunger rod in response to oscillation of said lever and thereby enlarging and reducing the size of the pump chamber, means including a normally closed flutter valve establishing communication between said pump chamber and one of said reservoirs, an outflow valve connected with said pump chamber and being a normally closed pressure opened valve so that liquid in said chamber is expressed through said outflow valve in response to compression in said pump chamber and said flutter valve is simultaneously closed, and so that said outflow valve is closed in response to the suction stroke of the pump at which time said inflow valve is opened thereby completely replenishing the supply of liquid in said pump chamber, a metering assembly operatively connected with each pump, each metering assembly comprising means for establishing a limit of travel of said plunger rod in a direction which compresses said pump chamber, said stop establishing means including a metering rod carried by one of said subframes, and an adjustable stop associated with said metering rod and said pump plunger rod.

9. The combination of claim 8 wherein there are means connected between said last mentioned subframe and said metering rod to hold said metering rod in a selected position lengthwise thereof.

References Cited in the file of this patent

UNITED STATES PATENTS

| | | |
|---|---|---|
| 594,196 | Cramer | Nov. 23, 1897 |
| 2,160,983 | Painter | June 6, 1939 |